United States Patent
Cho

(10) Patent No.: US 9,991,500 B2
(45) Date of Patent: Jun. 5, 2018

(54) RECHARGEABLE BATTERY

(71) Applicant: Samsung SDI Co., Ltd., Yongin-si, Gyeonggi-do (KR)

(72) Inventor: Ja-Kyung Cho, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 340 days.

(21) Appl. No.: 14/163,126

(22) Filed: Jan. 24, 2014

(65) Prior Publication Data

US 2015/0017519 A1     Jan. 15, 2015

(30) Foreign Application Priority Data

Jul. 12, 2013    (KR) ......................... 10-2013-0082147

(51) Int. Cl.
     *H01M 2/02*         (2006.01)
     *H01M 2/30*         (2006.01)

(52) U.S. Cl.
     CPC ............ *H01M 2/30* (2013.01); *H01M 2/0275* (2013.01)

(58) Field of Classification Search
     CPC ...... H01M 2/30; H01M 2/0275; H01M 2/263; H01M 2/021; H01M 2/26
     See application file for complete search history.

(56) References Cited

U.S. PATENT DOCUMENTS

| | | | | |
|---|---|---|---|---|
| 2003/0134184 | A1* | 7/2003 | Skinlo et al. | 429/94 |
| 2006/0222935 | A1* | 10/2006 | Takahashi et al. | 429/142 |
| 2006/0263683 | A1* | 11/2006 | Yoon | H01M 2/30 429/178 |
| 2011/0086264 | A1* | 4/2011 | Tsukamoto | H01M 2/0277 429/184 |
| 2011/0129707 | A1 | 6/2011 | Ahn et al. | |
| 2011/0217591 | A1* | 9/2011 | Heo | H01M 2/204 429/211 |

FOREIGN PATENT DOCUMENTS

| | | |
|---|---|---|
| JP | 3775633 B2 | 3/2006 |
| JP | 2006-147534 A | 6/2006 |

\* cited by examiner

*Primary Examiner* — Jimmy Vo
(74) *Attorney, Agent, or Firm* — Knobbe Martens Olson & Bear LLP

(57) ABSTRACT

A rechargeable battery is disclosed. In one aspect, the rechargeable battery includes an electrode assembly including a positive electrode, a negative electrode, and a separator interposed between the positive electrode and the negative electrode. The rechargeable battery also includes a pouch which receives the electrode assembly and an electrode tab including a positive electrode tab and a negative electrode tab electrically connected to the electrode assembly and outwardly protruding from the pouch. The width of a portion of the electrode tab electrically connected to the electrode assembly inside the pouch is greater than the width of a portion outwardly protruding from the pouch.

16 Claims, 4 Drawing Sheets

RECHARGEABLE BATTERY

CROSS-REFERENCE TO RELATED APPLICATIONS

This application claims priority to and the benefit of Korean Patent Application No. 10-2013-0082147 filed in the Korean Intellectual Property Office on Jul. 12, 2013, the entire contents of which are incorporated herein by reference.

BACKGROUND

Field

The described technology generally relates to a rechargeable battery which can reduce an increase in thickness and improve the stability thereof.

Description of the Related Technology

A rechargeable battery can be charged and discharged multiple times, unlike a primary battery that cannot be recharged. Low-capacity rechargeable batteries can be used as a power supply for small electronic devices, such as cellular phones, notebook computers, and camcorders, while high-capacity rechargeable batteries can be used as a power supply for driving motors in hybrid vehicles and the like.

The standard rechargeable battery includes an electrode assembly made of a positive electrode, a negative electrode, and a separator, a case which receives the electrode assembly, and an electrode tab connected to the electrode assembly. The case is typically classified into cylindrical, prismatic, pouch, etc., according to its shape. Among case types, a pouch type rechargeable battery can be easily formed to have various exterior shapes and generally has a low weight. Pouch type rechargeable batteries can therefore be made of a laminate sheet that is generally used as the exterior of a lithium ion rechargeable battery.

SUMMARY OF CERTAIN INVENTIVE ASPECTS

One inventive aspect is a rechargeable battery in which current is not concentrated at a portion where an electrode tab and an electrode assembly are electrically connected while reducing the thickness of the rechargeable battery.

Another aspect is a rechargeable battery including an electrode assembly including a positive electrode, a negative electrode, and a separator interposed between the positive electrode and the negative electrode, a pouch receiving the electrode assembly, and an electrode tab including a positive electrode tab and a negative electrode tab, each of the positive and negative electrode tabs including a first portion electrically connected to the electrode assembly and a second portion protruded to the exterior of (or outwardly protruding from) the pouch, wherein the width of the first portion is greater than the width of the second portion.

The thickness of the second portion may be greater than the thickness of the first portion.

The first portion may have a plate layer shape. The thickness of the first portion may be less than the thickness of each of the positive electrode and the negative electrode.

The positive and negative electrode tabs may be arranged in a substantially planar fashion at an inner plane surface of the electrode assembly.

The electrode tab may have an inclination surface formed between the first and second portions.

The sum of the plane areas of the first portions of the electrode tab may be greater than about 80% of the plane area of the electrode assembly.

According to at least one embodiment, the thickness of the electrode tab is reduced inside the pouch of the rechargeable battery and the area of the electrode tab electrically connected to the electrode assembly may be expanded such that the overall thickness of the rechargeable battery may be reduced, thereby improving the durability thereof.

According to at least one embodiment, in the pouch of the rechargeable battery, the connection area between the electrode tab and the electrode assembly may be increased such that a concentration of current in the connection area may be substantially prevented, thereby substantially preventing the occurrence of explosions.

DETAILED DESCRIPTION OF CERTAIN INVENTIVE EMBODIMENTS

Figure 1:
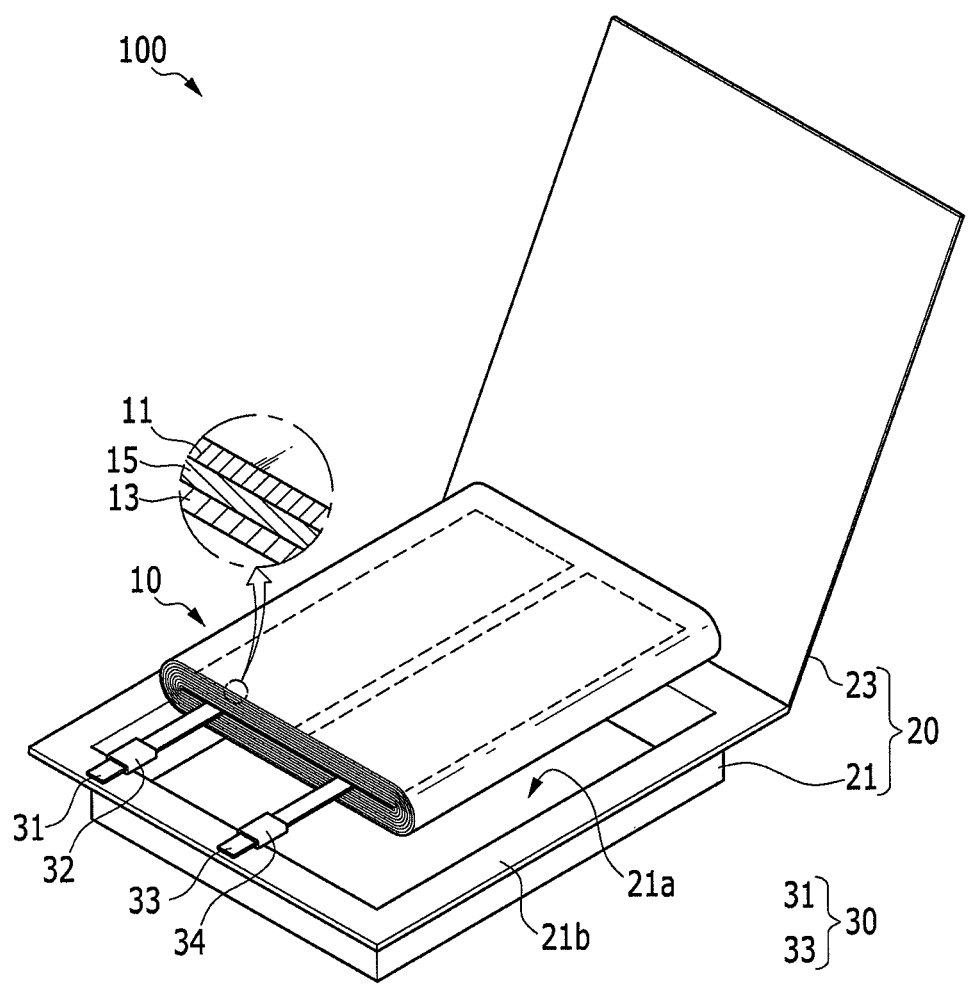
FIG. 1 is a schematic view of a rechargeable battery according to an exemplary embodiment.

The electrode tab of a rechargeable battery is typically connected to the electrode assembly inside the pouch, and a portion thereof is protruded to the exterior of the pouch. The portion of the electrode tab inside the pouch is typically formed with a greater thickness than each of the positive electrode, the negative electrode, and the separator. Accordingly, the thickness of the portion of the electrode assembly where the electrode tab is connected to the electrode assembly can be thicker than the other portions of the electrode assembly. Therefore, current can be concentrated at the portion where the electrode tab is connected to the electrode assembly which may result in an explosion. Also, the overall thickness of the rechargeable battery may increase because of the thickness of the connection portion of the electrode tab and the rechargeable battery may have a low durability due to the concentration of current.

The described technology will be described more fully hereinafter with reference to the accompanying drawings, in which exemplary embodiments of the described technology are shown. As those skilled in the art would realize, the described embodiments may be modified in various different ways, all without departing from the spirit or scope of the described technology. The drawings and description are to be regarded as illustrative in nature and not restrictive. Like reference numerals designate like elements throughout the specification.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the described technology.

FIG. 1 is a schematic view of a rechargeable battery according to an exemplary embodiment.

As shown in FIG. 1, a rechargeable battery 100 according to an exemplary embodiment includes an electrode assembly 10 including a positive electrode 11, a negative electrode 13, and a separator 15 interposed between the positive and negative electrodes 11 and 13. The electrode assembly 10 also includes a pouch 20 which receives the electrode assembly 10 and an electrode tab 30 electrically connected to the electrode assembly 10. The electrode tab 30 includes a positive electrode tab 31 and a negative electrode tab 33 which protrude beyond the exterior of the pouch 20.

In some embodiments, the electrode assembly 10 is formed in a jelly-roll structure in which the positive and negative electrodes 11 and 13 have a belt shape and are spiral-wound with the separator 15 interposed therebetween.

The positive and negative electrodes 11 and 13 respectively include a positive electrode layer and a negative active material layer. The positive electrode layer and the negative active material layer are respectively coated with a positive active material and a negative active material. Additionally, the positive and negative electrodes 11 and 13 respectively include positive and negative electrode uncoated regions which are not coated with the positive active material or the negative active material. The positive and negative electrode tabs 31 and 33 are respectively electrically connected to the positive and negative uncoated regions. The positive and negative electrode tabs 31 and 33 can be respectively electrically connected to the positive and negative electrodes 11 and 13 at an inner plane surface of the electrode assembly. For example, as illustrated in FIG. 1, the positive and negative electrodes 11 and 13 can be spiral-wound around the positive and negative electrode tabs 31 and 33 which are arranged in a substantially planar fashion. The positive and negative electrode tabs 31 and 33 protrude from the electrode assembly 10 in a direction substantially perpendicular to the direction that the electrode assembly 10 is spiral-wound. The structure of the electrode assembly of the described technology is not limited to a jelly-roll shape; the electrode assembly can have another shape, for example, a stacked-type electrode assembly, may be employed.

The pouch 20 includes a case 21 which receives the electrode assembly 10 and a cover 23 which covers the upper portion of the case 21. The case 21 includes a receiving portion 21a including a bottom surface portion and a side portion in which the electrode assembly 10 is to be received, and a sealing portion 21b which contacts the cover 23 after receiving the electrode assembly 10. When the case 21 and the cover 23 contact each other the entire exterior of the rechargeable battery 100 is enclosed therein, housing the electrode assembly 10 within the pouch 20. In the present exemplary embodiment, the pouch 20 is formed of a laminate sheet with a multi-layer structure in which polymers are coated on both surfaces of a metal film. However, the described technology is not limited by the above described structure of the pouch, and the structure of the pouch may be variously modified or changed by a person of ordinary skill in the art.

When the electrode assembly 10 is installed in the pouch 20 and is sealed, the positive and negative electrode tabs 31 and 33 are protruded from one side of the pouch 20. Here, insulation layers 32 and 34 may be additionally formed to electrically insulate a portion of the pouch 20 from the electrode tab 30. The insulation layers 32 and 34 enclose each of the electrode tabs 30 such that direct contact between the electrode tabs 30 and the pouch 20 is prevented. The insulation layers 32 and 34 may help sealing the contacting portions of the pouch 20 in addition to preventing short circuiting. Additionally, the surface of the polymer forming the inner surface of the pouch 20 may include a component which has an excellent cohesion property to enhance cohesion between the polymer forming the inner surface of the pouch 20 and the electrode tabs 30 or the insulation layers 32 and 34. When forming the pouch, a process of pressing the laminate sheet can be employed. By using the press process, the laminate sheet is elongated to form the receiving portion 21a for receiving the electrode assembly 10.

Additionally, the electrode tab 30 is positioned inside the pouch 20 such that a first portion A thereof that is electrically connected to the electrode assembly 10 and a second portion B thereof that is protruded to the exterior of the pouch 20 each have different shapes. This configuration will be described in detail later.

Figure 2:
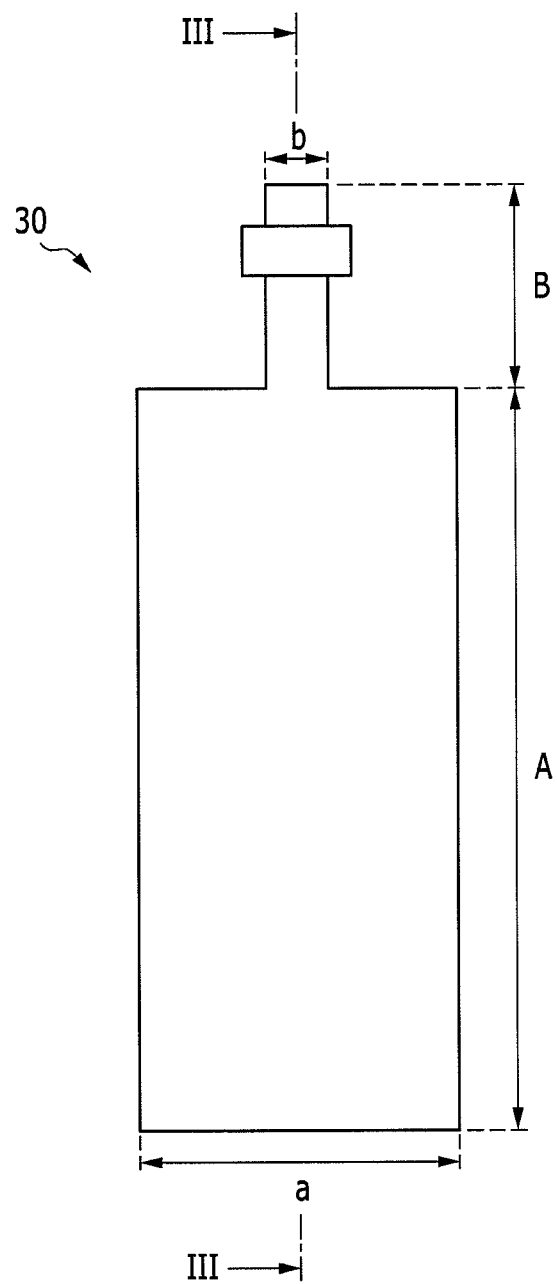
FIG. 2 is a schematic view of the electrode tab of FIG. 1.

FIG. 2 is a schematic view of an electrode tab which is installed inside the case of FIG. 1.

In some embodiments, as shown in FIG. 2, the width a of the first portion A of the electrode tab 30 is greater than the width b of the second portion B of the electrode tab 30. As described above, since the width a is greater than the width b, the width a of the first portion A of the electrode tab 30 inside the pouch 20 is relatively broad so that the thickness of the first portion A can be reduced, and consequently, the stability thereof can be improved. This will be described in detail with reference to FIG. 3.

Figure 3:
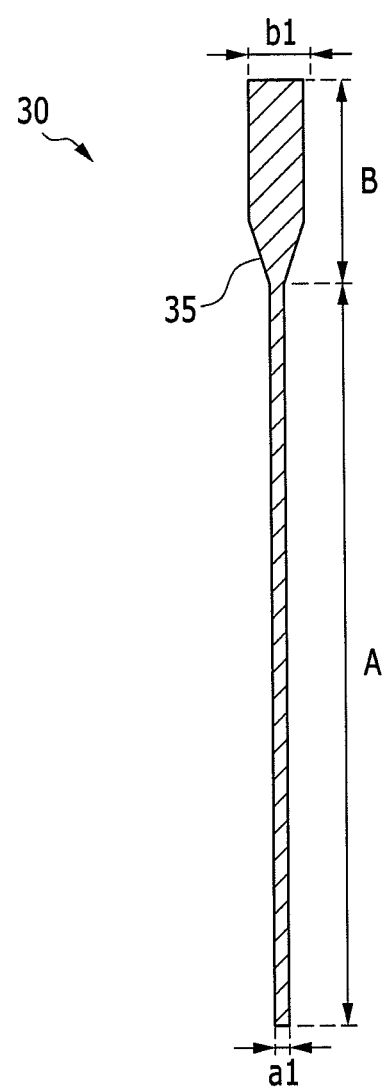
FIG. 3 is a view taken along the line of FIG. 2.

FIG. 3 is a view taken along the line III-III of FIG. 2.

As shown in FIG. 3, the thickness a1 of the first portion A of the electrode tab 30 is less than the thickness b1 of the second portion B. As described above and illustrated in FIGS. 2 and 3, the thickness a1 of the first portion A is less than the thickness b1 of the second portion B and the area of the first portion A connected to the electrode assembly 10 is comparatively large. Accordingly, the thickness a1 of the first portion A may be remarkably reduced such that the overall thickness of the rechargeable battery 100 may be reduced. Also, since the thickness of the first portion A is reduced a local concentration of current may be substantially prevented, thereby improving the stability of the rechargeable battery 100.

In the present exemplary embodiment, the first portion A of the electrode tab 30 that is electrically connected to the electrode assembly 10 may have a plate layer shape, or a planar shape. Additionally, the thickness of the plate layer of the electrode tab 30 (the first portion A) may be less than the thickness of the positive electrode or the negative electrode. As described above, the first portion A connected to the electrode assembly 10 has a thickness less than the thickness of each of the positive and negative electrodes in order to reduce the overall thickness of the electrode assembly 10, thereby improving the stability thereof.

Figure 4:
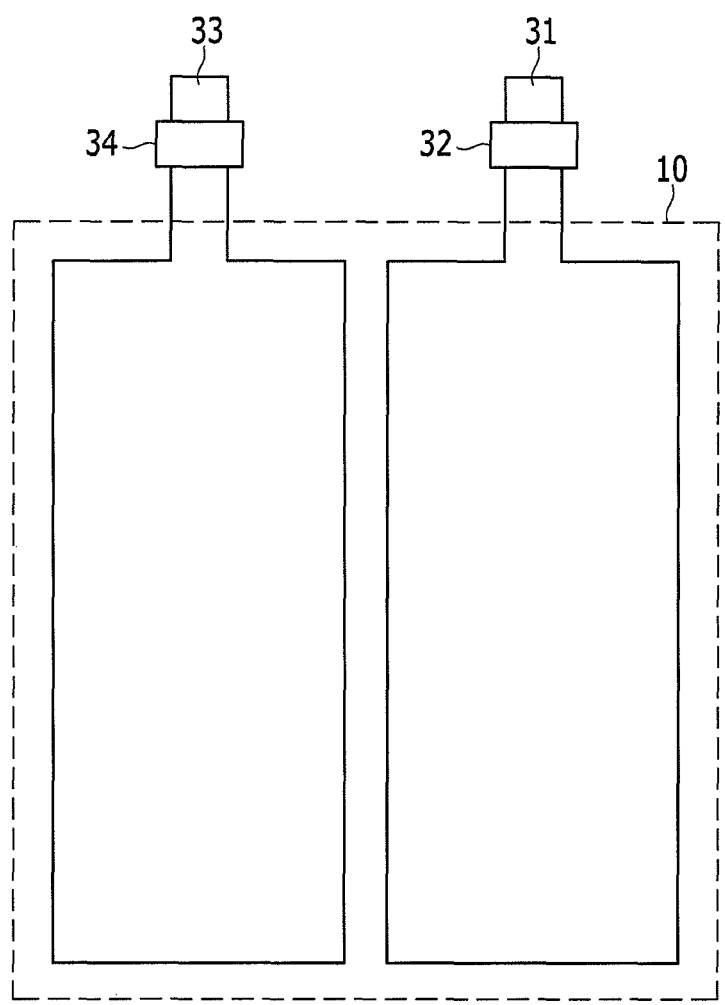
FIG. 4 is a schematic view of a positive electrode tab and a negative electrode tab which are installed in the electrode assembly shown in FIG. 1.

FIG. 4 is a schematic view of the positive and negative electrode tabs 31 and 33 installed in the electrode assembly illustrated in FIG. 1.

As shown in FIG. 4, the sum of the plane areas of the first portions A of the positive and negative electrode tabs 31 and 33 inside the pouch 20 may be greater than about 80% of the plane area of the electrode assembly 10. As described above, since the area of the first portions A of the electrode tab 30 is greater than about 80% of the plane area of the electrode assembly 10, the overall thickness of the rechargeable battery 100 may be reduced while the current transmission distribution from the electrode assembly 10 is substantially smoothed. However, the area occupied by the electrode tab 30 inside the electrode assembly 10 is not limited to being greater than about 80% of the entire area of the electrode assembly 10. According to some embodiments, the plane area occupied by the first portions A of the electrode tab 30 may be less than about 80% of the entire area of the electrode assembly 10. The area in which the first portions A of the electrode tab 30 are installed may be appropriately changed in consideration of the position where the electrode assembly 10 is installed inside the pouch 20.

In some embodiments, with reference to FIG. 3, the electrode tab 30 has an inclination surface 35 between the first portion A of the electrode tab 30 positioned inside the pouch 20 and the second portion B of the electrode tab 30 protruded to the exterior of the pouch 20. The inclination surface 35 may substantially prevent the concentration of stress applied to the electrode tab 30, and consequently the durability of the electrode tab 30 may be improved.

While the disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:
   an electrode assembly including a positive electrode, a negative electrode, and a separator interposed between the positive and negative electrodes;
   a pouch housing the electrode assembly; and
   an electrode tab including a positive electrode tab and a negative electrode tab, wherein each of the positive and negative electrode tabs includes i) a first portion electrically connected to the electrode assembly inside the pouch and ii) a second portion extending from the first portion and protruding outwardly from the pouch,
   wherein the positive and negative electrodes respectively include a positive electrode layer and a negative active material layer, wherein the positive electrode layer and the negative active material layer are respectively coated with a positive active material and a negative active material, wherein the positive and negative electrodes respectively include positive and negative electrode uncoated regions which are not coated with the positive active material or the negative active material, wherein the positive and negative electrode tabs contact the positive and negative uncoated regions,
   wherein the width of the first portion is greater than the width of the second portion, wherein the thickness of each of the second portions is greater than the thickness of each of the first portions, wherein each of the positive and negative electrode tabs has an inclined portion formed between the first and second portions, wherein the thickness of the inclined portion gradually increases from the first portion to the second portion, wherein the first portion is inserted into the electrode assembly and integrally formed with the second portion, and wherein the first portion of each electrode tab is fully surrounded by the positive and negative electrodes.

2. The rechargeable battery of claim 1, wherein the first portion has a substantially planar shape.

3. The rechargeable battery of claim 1, wherein the thickness of the first portion is less than the thickness of each of the positive and negative electrodes.

4. The rechargeable battery of claim 1, wherein the positive and negative electrode tabs are arranged in a substantially planar fashion at an inner plane surface of the electrode assembly.

5. The rechargeable battery of claim 1, wherein the sum of the plane areas of the first portions of the positive and negative electrode tabs is greater than about 80% of the plane area of the electrode assembly.

6. The rechargeable battery of claim 1, further comprising a pair of insulation layers respectively configured to electrically insulate the positive and negative electrode tabs from the pouch.

7. The rechargeable battery of claim 1, wherein the second portions do not contact each other.

8. The rechargeable battery of claim 1, further comprising a pair of insulation layers respectively surrounding the second portions.

9. The rechargeable battery of claim 1, wherein the first portion of each electrode tab is inserted into a middle portion of the electrode assembly.

10. A rechargeable battery, comprising:
    an electrode assembly comprising a positive electrode, a negative electrode, and a separator interposed between the positive and negative electrodes;
    a pouch housing the electrode assembly; and
    positive and negative electrode tabs, each comprising i) a first portion electrically connected to the electrode assembly and ii) a second portion outwardly extending from the first portion such that at least part of the second portion is exposed to the exterior of the pouch,
    wherein the positive and negative electrodes respectively include a positive electrode layer and a negative active material layer, wherein the positive electrode layer and the negative active material layer are respectively coated with a positive active material and a negative active material, wherein the positive and negative electrodes respectively include positive and negative electrode uncoated regions which are not coated with the positive active material or the negative active material, wherein the positive and negative electrode tabs contact the positive and negative uncoated regions,
    wherein the thickness of each of the first portions is less than the thickness of each of the second portions, wherein the thickness of the inclined portion gradually increases from the first portion to the second portion, wherein the first portion is inserted into the electrode assembly and integrally formed with the second portion, and wherein the first portion of each electrode tab is fully surrounded by the positive and negative electrodes.

11. The rechargeable battery of claim 10, wherein the width of each of the first portions is greater than the width of each of the second portions.

12. The rechargeable battery of claim 10, wherein the first portions each have a substantially planar shape.

13. The rechargeable battery of claim 10, wherein the thickness of each of the first portions is less than the thickness of each of the positive and negative electrodes.

14. The rechargeable battery of claim 10, wherein the first portions of the positive and negative electrode tabs are arranged in a substantially planar fashion and wherein the electrode assembly is spiral-wound around the first portions.

15. The rechargeable battery of claim 10, wherein the sum of the plane areas of the first portions is greater than about 80% of the plane area of the electrode assembly.

16. The rechargeable battery of claim 10, further comprising a pair of insulation layers respectively configured to electrically insulate the positive and negative electrode tabs from the pouch.

* * * * *